United States Patent
Enokida et al.

(10) Patent No.: US 6,493,171 B2
(45) Date of Patent: *Dec. 10, 2002

(54) ADAPTIVE SKEW SETTING FOR A DISK DRIVE

(75) Inventors: Yoko Enokida, Milpitas, CA (US); Dick Pitzer, San Jose, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/822,804

(22) Filed: Mar. 30, 2001

(65) Prior Publication Data

US 2002/0060867 A1 May 23, 2002

Related U.S. Application Data

(63) Continuation-in-part of application No. 09/277,506, filed on Mar. 26, 1999, now Pat. No. 6,424,485.

(51) Int. Cl.[7] .......................... G11B 21/02; G11B 5/596; G11B 15/12
(52) U.S. Cl. .......................... 360/75; 360/63; 360/78.04
(58) Field of Search .......................... 360/31, 61, 76, 360/78.04, 75, 63, 78.08; 324/210, 212; 711/111, 112

(56) References Cited

U.S. PATENT DOCUMENTS 5,568,606 A    10/1996  Dobbek
5,835,299 A  * 11/1998  Lee et al. ..................... 360/76

* cited by examiner

*Primary Examiner*—Andrew L. Sniezek
(74) *Attorney, Agent, or Firm*—Steven G. Roeder; James P. Broder (57) ABSTRACT

A method of manufacturing a disk drive (10) including determining and implementing skew values for each head (12a–12d) of the disk drive (10) during a production test phase is provided herein. The method for each head (12a–12d) includes initiating a head switch test series, measuring a head switch time, computing an average head switch time, computing a standard deviation of the head switch times, and computing a head skew based on the average and the standard deviation of the head switch times. The method for each head (12a–12d) further includes initiating a single-cylinder seek test, measuring a single-cylinder seek time, computing an average single-cylinder seek time, computing a standard deviation of the single-cylinder seek times, and computing a cylinder skew based on the average and the standard deviation of the single cylinder seek times. The present invention also includes a disk drive (10) that includes a base (24), at least one storage disk (14), at least one actuator arm (26a–26d) for positioning each of the heads (12a–12d) near the storage disk (14), and skew settings for each of the heads (12a–12d) determined during a production test phase of the disk drive (10) manufacturing process. Individual skew settings for each head (12a–12d) ensure a greater precision in disk drive (10) operation and an increased efficiency of the disk drive (10).

26 Claims, 7 Drawing Sheets

ADAPTIVE SKEW SETTING FOR A DISK DRIVE

CROSS REFERENCE TO RELATED APPLICATION

This application is a continuation-in-part under 35 U.S.C. § 120 of U.S. Ser. No. 09/277,506, filed Mar. 26, 1999, now U.S. Pat. No. 6,424,485 the entire contents of which are hereby incorporated herein by reference as if fully set forth herein.

FIELD OF THE INVENTION

The present invention relates generally to methods for preparing and operating disk drives for computer systems. More particularly, the present invention relates to methods for improving disk drive performance by determining and implementing skew settings for each data transducer of each disk drive.

BACKGROUND

Data storage devices are widely used in computers and data processing systems for storing information in digital form. These devices include disk drives, which commonly use one or more rotating magnetic storage disks to store data. Each storage disk typically includes a data storage surface on each side of the storage disk. These storage surfaces are divided into a plurality of narrow, annular, concentric regions of different radii, commonly referred to as "tracks". Additionally, each storage surface typically includes a plurality of wedge-shaped "sectors". Typically, a read/write head is utilized to transfer data to and from the tracks of the data storage surfaces. As used herein, the read/write head is also sometimes referred to as a "head" or a "data transducer".

Within data storage devices, e.g. disk drives, if a sequential data transfer crosses a boundary from one head to another, or crosses a cylinder boundary, i.e., when data associated with the last sector of a track and the first sector of the next sequential track are included in the transfer, there is a negative impact on data throughput since the transfer of data must be interrupted while a head switch or single-cylinder seek procedure is completed. The term "seek time" describes the latency that occurs from the initiation of a head switch or single-cylinder seek operation until the data transfer can be continued, i.e. restarted.

Figure 2:
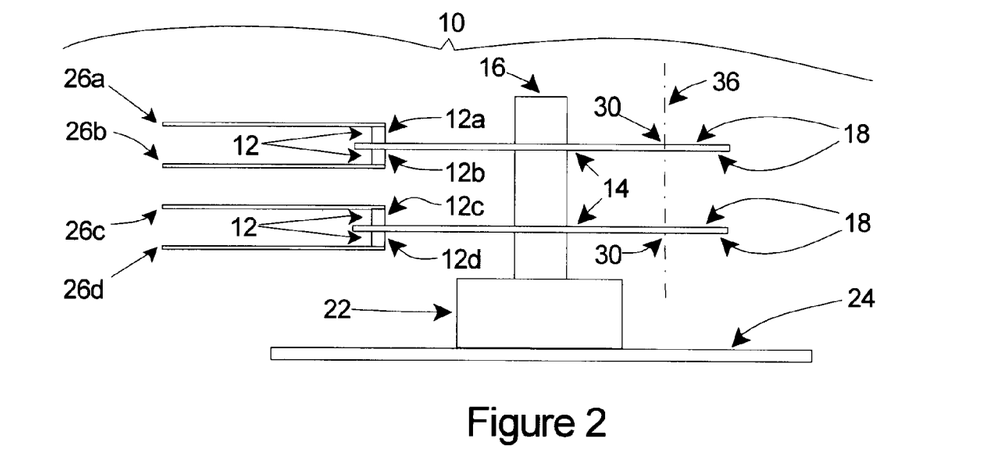
FIG. 2 is a further side elevational view of the portion of the disk drive of FIG. 1, illustrating a cylinder.

A "seek" process encompasses activities associated with positioning the heads to a predetermined location on the disk drive medium (sometimes referred to herein as a "target track") to initiate data recording and data retrieval sequences. The seek process will typically involve one or both of the following steps:

1. A "single-cylinder seek", also known as "cylinder switch", involves operating the actuator to move the heads across the disk surfaces. This motion permits moving the heads from cylinder to cylinder, as required. Moving the heads from a cylinder to a next adjacent cylinder, e.g. moving from cylinder to cylinder, is known as a single-cylinder seek.

2. "Head selection", also known as "head switch", involves activating different heads which are associated with different storage surfaces of the storage disks to be used during a required data transfer. As illustrated in FIG. 2, a head switch occurs when a data transfer first requires head 12a, then head 12b to be sequentially activated, for example A "skew" of a track is defined as the physical offset of logical sector zero of the target track from logical sector zero of the preceding track. Stated another way, because the storage disks continue to rotate during the latency period caused by a single-cylinder seek or a head switch, a particular measurable offset occurs, called a "skew". By configuring the disk drive to account for these known "delays" or skews, the disk drive is able to operate with greater efficiency, with a decrease in the interruption time while reading and/or writing data to a storage disk. The purpose of the skew is to improve disk drive performance by compensating for the rotation of the medium that occurs during the time it takes to complete a corresponding seek operation. The size of the physical offset, or the "skew value", is determined by the seek time associated with the required operation.

Disk drive units typically use two different track skew values: "head skew", which is associated with a head switch operation, i.e. switching from one head to another, and "cylinder skew", which involves a single-cylinder seek operation, i.e. movement of the head from one cylinder to another. Since the time required to complete a head switch operation will usually differ from that required for a single-cylinder seek operation, different skews are associated with each operation. For example, during sequential data transfer operations, in a disk drive unit having n heads, track zero of each cylinder is always assumed to be the target track during a single-cylinder seek operation and is given a cylinder skew consistent with that operation. During a head switch operation, each of the tracks 1 through n-1 associated with each cylinder is assumed to be a target track and receives a head skew consistent with that operation.

In the past, skew values associated with a particular disk drive product were determined during the product development cycle. Commonly, all disk drive units in a product line carried the same skew values. Skew values have typically been determined by several factors, among them head mass, disk rotation speed (RPM), flexibility of the flex cable, etc. The prevailing approach was to use greater skew values that would avoid "slipped revolutions", i.e. when a data transfer is delayed a full disk revolution because of an intervening head switch or single-cylinder seek operation. The prevailing thought has been that the skew values should be higher than measured in order to provide a "margin of safety" in order to prevent slipped revolutions. Unfortunately, the problem with this approach has been that by using somewhat higher skew values to avoid slipped revolutions, a decrease in efficiency was realized over time. Higher skew values result in longer access times, which is not conducive to high performance. In other words, excessively increasing the skew value in an attempt to avoid a slipped revolution results in a greater loss of time than more precisely setting the skew value and suffering an occasional slipped revolution.

In addition, slight changes in shape occur to the heads of a disk drive during operation. These changes occur as a result of heat, aerodynamic forces, etc. Oftentimes, one head can become misaligned relative to the other heads following usage of the disk drive. Head misalignment can impact the skew value of each individual head. This effect on the skew values can adversely affect the speed and efficiency of the disk drive.

Therefore, there exists a need for a method of determining skew values for each individual disk drive and implementing the values into each drive in a manner that is conducive to high performance disk drives. Further, the need exists to provide a method for determining skew values for each individual head of every disk drive, and implementing the skew values into each drive. Still another need exists to provide a disk drive consistent with this methodology which is relatively easy and inexpensive to manufacture.

SUMMARY

The present invention satisfies these needs. A general object of the present invention is to determine and implement skew values for each disk drive to improve performance of the disk drive. Preferably, head skew and cylinder skew values are calculated and implemented for each of the heads of the disk drive during a production test phase of the disk drive manufacturing process. Uniquely, data is compiled during the production test phase of the disk drive manufacturing process and is used to calculate and implement skew values for each individual head of each disk drive.

Preferably, the method of manufacturing a disk drive includes initiating a head switch test series for a first head, measuring a head switch time for the first head, computing an average head switch time for the first head, computing a standard deviation of the head switch times for the first head, and computing a head skew based on the average and the standard deviation of the head switch times for the first head. This process is typically repeated for each head in the disk drive.

The present invention is also directed toward a disk drive that includes a base, at least one storage disk mounted to the base, and at least one actuator arm for positioning a head near the storage disk. Importantly, the disk drive also includes skew settings for each of the heads determined during a production test phase of the disk drive manufacturing process. By determining individual skew settings for each of the heads, a greater precision in disk drive operation is achieved. Additionally, accurately setting the skews for each head results in an increased efficiency of the disk drive.

These and other aspects and advantages of the present invention will become apparent upon reading the following detailed descriptions and studying the various figures of the drawings.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

In the following description, numerous specific details are set forth in order to provide a thorough understanding of the present invention. It will be obvious, however, to one skilled in the art, that the present invention may be practiced without some or all of these specific details. In other instances, well-known structures and process steps have not been described in detail in order not to unnecessarily obscure the present invention.

The present invention involves the adaptive determination of skew values for individual disk drives 10, each disk drive 10 including at least one read/write head 12, often simply referred to as a "head". More specifically, the present invention is directed toward determining skew values for each individual head 12 of each disk drive 10. The determination of skew values is made during the production test phase of the disk drive 10 manufacturing process. As referred to herein and as known to those skilled in the art, "production test phase" refers to a phase during the disk drive 10 manufacturing process, after the disk drive 10 has been assembled but before the disk drive 10 leaves the factory, when each disk drive 10 undergoes a series of tests.

In addition, as used herein, "disk drive manufacturing process" refers to the totality of steps involved in manufacturing a disk drive 10, including the assembly, testing, etc. In accordance with the present invention, skew values are calculated using information collected during the production test phase. The present invention utilizes these data to calculate and implement skew values for each disk drive 10, and each head 12 of each disk drive 10, by including instructions in the production test firmware expressly for that purpose.

Figure 1:
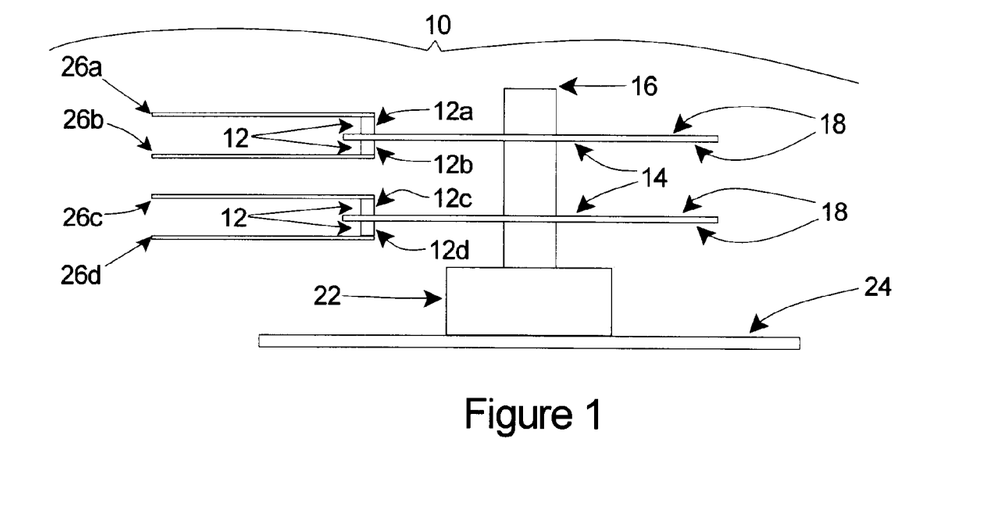
FIG. 1 is a side elevational view of a representation of a portion of a disk drive having features of the present invention.

FIG. 1 is a diagrammatic and simplified representation of a disk drive 10 having features of the present invention. In FIG. 1, the disk drive 10 includes a pair of rotating storage disks 14 mounted on a disk spindle 16. Each storage disk 14 is typically made of a metallic material, e.g., aluminum, and coated with a thin layer of magnetic material (not shown) in a manner that allows data to be recorded on a storage surface 18 of each storage disk 14. A disk motor 22 is mounted to a base 24 of the disk drive 10 and rotates the disk spindle 16 and the storage disks 14. FIG. 1 also illustrates the disk drive 10 as having a plurality of actuator arms 26a, 26b, 26c, 26d (also shown generically on FIGS. 5, 8A and 9A as "26"). As shown, each actuator arm 26a, 26b, 26c, 26d, is typically coupled to a read/write head 12a, 12b, 12c, 12d, including a first head, as shown on FIGS. 1 and 2. As used herein, any of the heads 12a, 12b, 12c, 12d, can be the first head. Alternatively, each actuator arm 26a, 26b, 26c, 26d, can be coupled to two or more heads (not shown). Importantly, the disk drive can include any number of actuator arms 26 and/or heads 12.

Figure 3A:
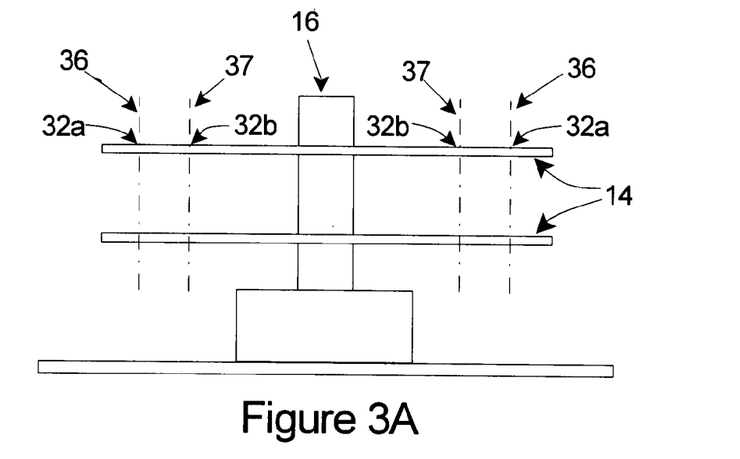
FIG. 3A is a side elevational view of the portion of the disk drive of FIG. 2 illustrating two separate cylinders.
Figure 3B:
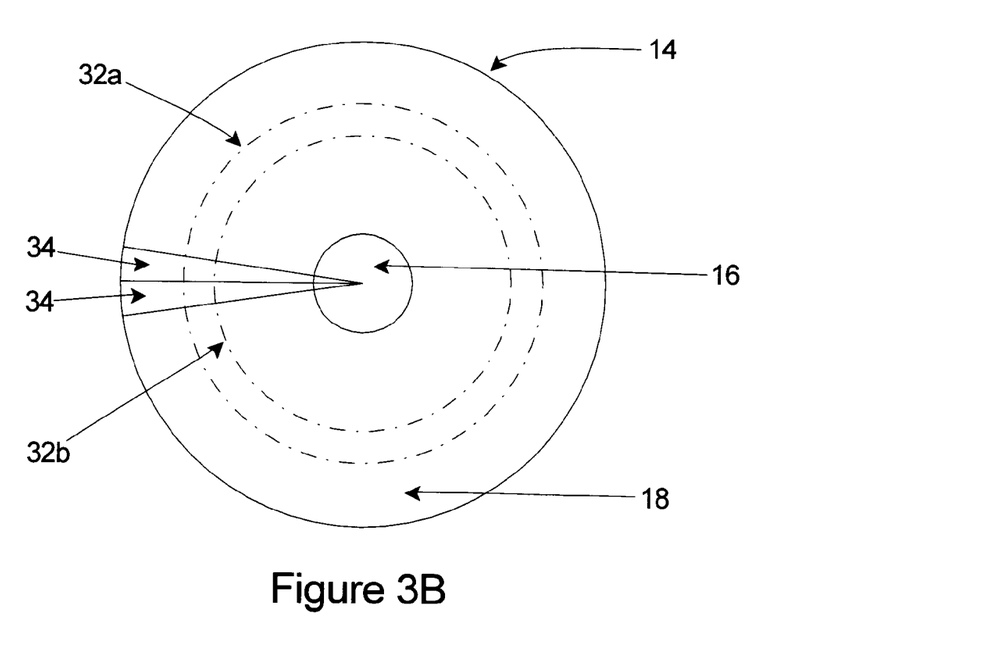
FIG. 3B is a top view of one of the storage disks illustrated in FIG. 3A.

Each head 12a, 12b, 12c, 12d, is used to record data on the storage surface 18 of the storage disks 14 and to retrieve data from the storage surface 18. In the embodiment illustrated in FIGS. 1 and 2, each of the actuator arms 26a, 26b, 26c, 26d, and the respective attached heads 12a, 12b, 12c, 12d, is associated with and unique to one storage surface 18 and forms part of an integrated actuator assembly (not shown). The actuator assembly is designed to permit controlled movement of the actuator arms 26a, 26b, 26c, 26d, moving all actuator arms 26a, 26b, 26c, 26d, simultaneously as a unit between a plurality of tracks 30 on the storage surface of the storage disks. For illustrative purposes, FIGS. 3A and 3B show storage disks 14 having a first track 32a and an adjacent second track 32b. Importantly, any of the tracks 30 on the storage disks 14 can be the first track 32a or the second track 32b, provided the first and second tracks 32a, 32b, are adjacent to each other.

As illustrated in FIG. 3B, data are organized into segments called data sectors 34 and are written to the storage surface 18 in one or more of the tracks 30. The tracks 30 are normally in the form of concentric circles spaced closely together. Typically, many sectors 34 are recorded on each track 30. For a track 30 on one specific storage surface 18 there is a corresponding track 30 in the same relative position on each of the other storage surfaces 18 of the remaining storage disks 14.

Figure 7:
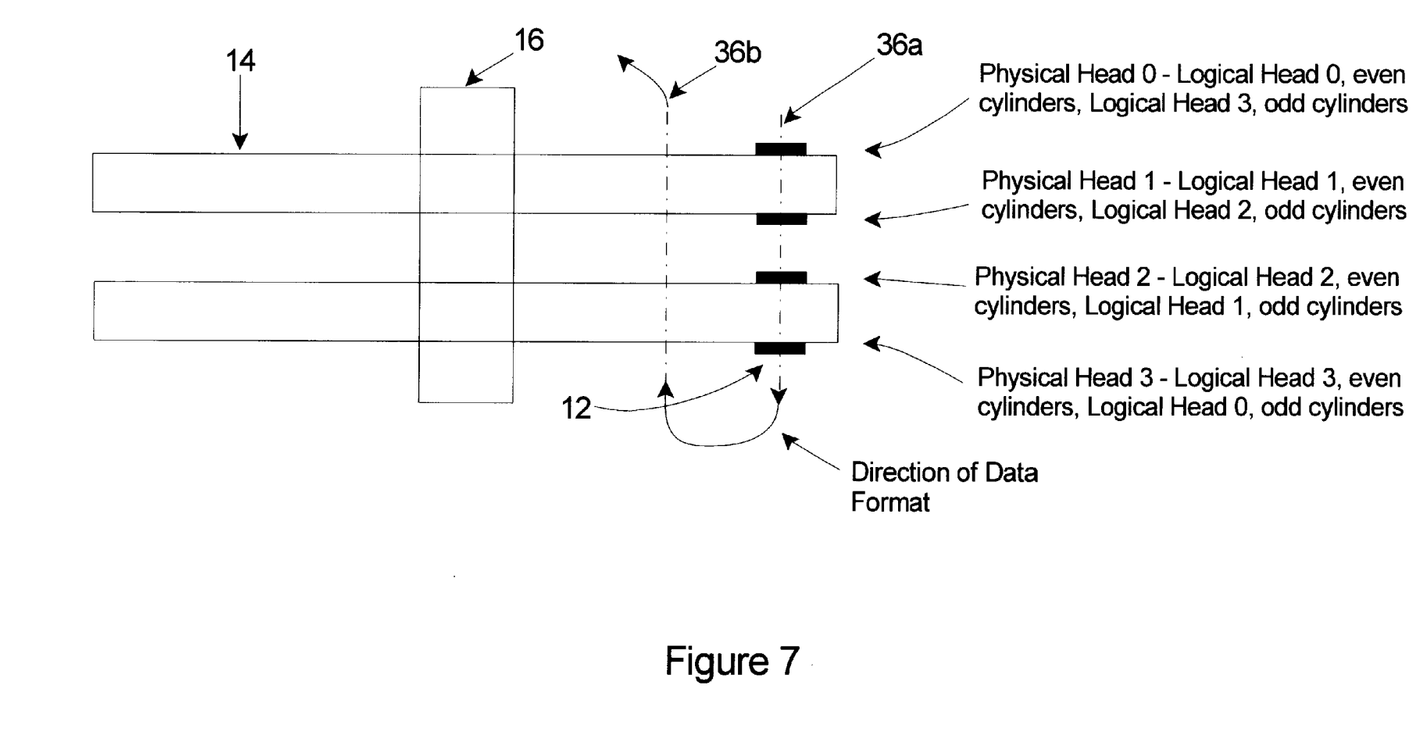
FIG. 7 is a representation of a side view of a portion of the disk drive with a plurality of data transducers.

The term "cylinder" 36 describes this relationship and is illustrated in FIGS. 2, 3A, and 7, which show heads 12a, 12b, 12c, 12d, aligned on respective tracks 30 that define the cylinder 36 (represented by the dashed line). Thus, a cylinder is composed of one track 30 from each storage surface 18 of each storage disk 14 of the disk drive 10. Each track 30 is in turn composed of a number of sectors 34. Traditionally, a disk drive 10 would have the same number of tracks 30 per cylinder 36 as the number of heads 12 present. For example, a disk drive 10 having two storage disks 14 (four storage surfaces 18 and four heads 12), would have four tracks 30 per cylinder 36, one track 30 per storage surface 18.

A "seek" process encompasses activities associated with positioning the heads 12 to a predetermined location on the storage disk 14 to initiate data recording and data retrieval sequences. The seek process will typically involve one or both of the following steps:

1. "Single-cylinder seek", also known as "cylinder switch" involves operating the actuator motor to move the heads 12 across the disk surfaces 18. This motion permits moving the heads 12 between cylinders 36, as required. Moving the heads 12 from one cylinder 36 to the next adjacent cylinder 37, (as shown in FIG. 3), is known as a single-cylinder seek.
2. "Head selection", also known as "head switch", involves activating different heads 12 to be used during a required data transfer. For example, a head switch occurs when, in FIG. 2, a data transfer requires head 12a and then head 12b to be sequentially activated.

Figure 4:
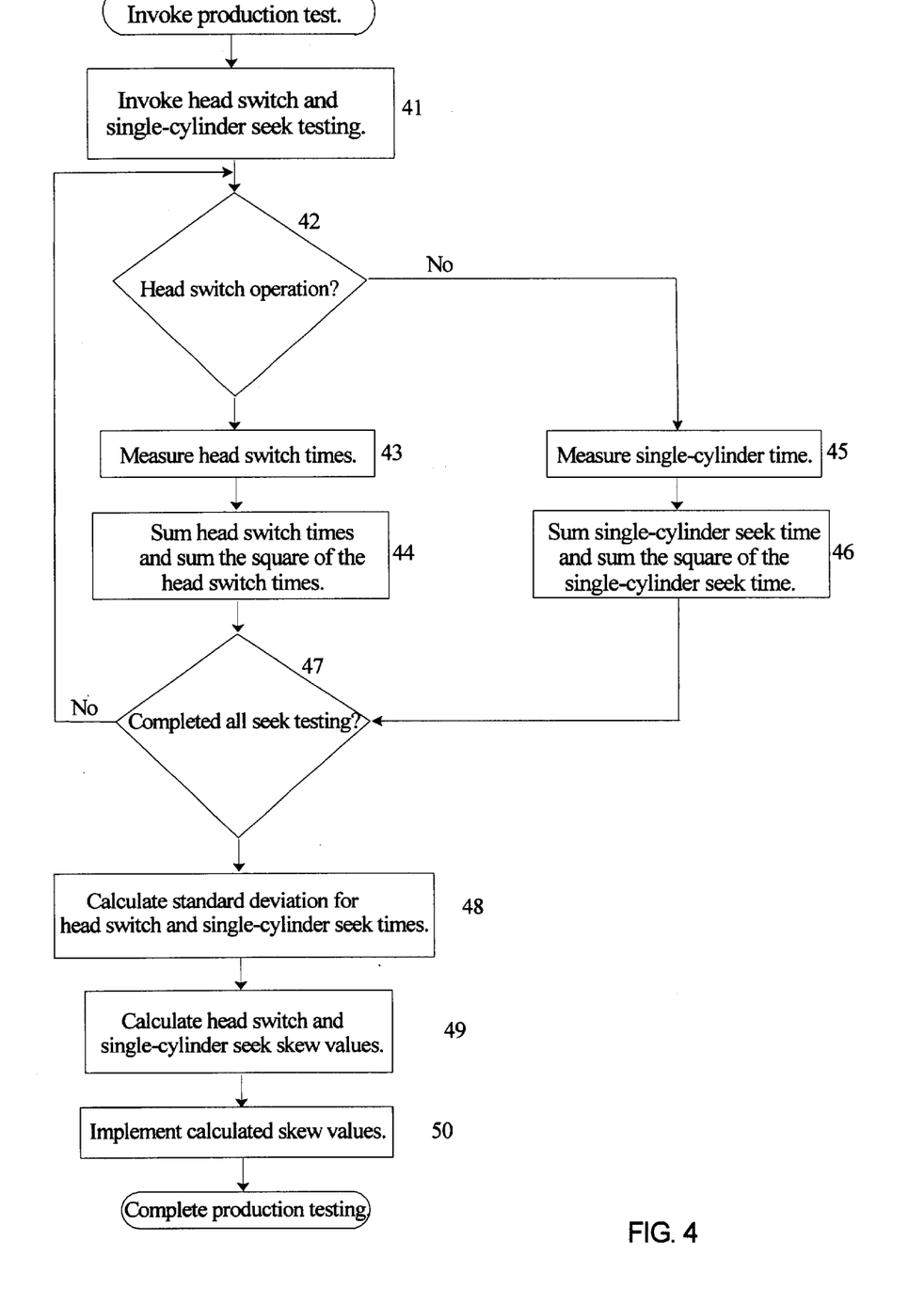
FIG. 4 is a flow diagram representation of a method for calculating and setting head skew and cylinder skew in accordance with principles of the present invention.

FIG. 4 shows a flow diagram for a method of executing the seek tests and the subsequent skew value calculations for each disk drive 10. After initializing for the seek tests at step 41, the system next determines whether a head switch or single-cylinder seek is involved commencing at step 42. If a head switch is involved, head switch time h is then measured at step 43. At step 44, the head switch times, h, are preferably summed in the following manner:

$$\sum_{i=1}^{n} h_i = \sum_{i=1}^{n-1} h_i + h_n$$

where n=the total number of individual head switch operations

=(number of read/write heads-1)*(number of cylinders in the drive)

Preferably, the summation of h is updated after every head switch time measurement. Typically, h is measured in either time (msec) or sector 34 count.

As shown, a summation of the squares of the head switch times, h, is also performed at step 44 in the following manner:

$$\sum_{i=1}^{n} h_i^2 = \sum_{i=1}^{n-1} h_i^2 + h_n^2$$

where n and h are as described above.

Alternatively, if a single-cylinder seek is involved, the single-cylinder seek time c is measured for all single-cylinder seeks at step 45. Then, at step 46 the sum of the seek times are calculated in the following manner:

$$\sum_{i=1}^{m} c_i = \sum_{i=1}^{m-1} c_i + c_m$$

where m equals the total number of individual single-cylinder seek operations, which equals the number of cylinders in a given storage disk 14 minus one (1). Preferably, the sum is updated after each single-cylinder seek time measurement.

A sum of the squares of the single-cylinder seek times, c, is also performed at step 46 in the following manner:

$$\sum_{i=1}^{m} c_i^2 = \sum_{i=1}^{m-1} c_i^2 + c_m^2$$

where m and c are as described above. As set forth in FIG. 4, the measurement and calculation of seek times are repeated until the last track is identified at step 47.

At step 48 standard deviations for head switch time and single-cylinder seek time are calculated. Standard deviation of head switch time summations, $S_h$, is calculated according to the following formula:

$$S_h = \sqrt{\frac{\sum_{i=1}^{n} h^2 - \frac{\left(\sum_{i=1}^{n} h\right)^2}{n}}{n-1}}$$

In addition, standard deviation $S_C$ for single-cylinder seek time summations is calculated according to the following formula:

$$S_c = \sqrt{\frac{\sum_{i=1}^{m} c^2 - \frac{\left(\sum_{i=1}^{m} c\right)^2}{m}}{m-1}}$$

Also at step 48, the average head switch and average single-cylinder seek times are determined.

Using the average seek time and standard deviations from above, skew values are then determined at step 49. Specifically, head skew, skew$_h$, is calculated according to the following relationship:

$$skew_h = \left(\frac{\sum_{i=1}^{n} h}{n}\right) + (as_h) + \Delta_h$$

where "a" represents a coefficient of standard deviation based on a standard Normal Probability Distribution Curve and $\Delta_h$ denotes a compensation value that can be specified for performance matching and/or control purposes. A typical default value for $\Delta_h$ is zero. The coefficient value "a" is selected based on the percentage of time that slipped revolutions will be allowed to occur.

A final determination of the head skew is set in accordance with specific user requirements and specifications. For example, if slipped revolutions will be allowed five percent (5%) of the time, the coefficient value according to the Normal Probability Distribution Curve is a=1.645. Slipped revolutions are generally considered detrimental to drive performance. However, as explained previously, the ironic consequence of avoiding slipped revolutions is that individual skew times may be lengthened, which is inconsistent with high performance requirements. Therefore, by allowing slipped revolutions to occur in a certain percentage of the time, the present invention is able to enhance performance of the disk drive 10.

Preferably, computation of the head skew includes conversion of the head switch times to a number of sectors 34 over which the head 12 passes during the head switch time. In addition, computation of the head skew preferably includes rounding the number of sectors 34 from the calculation of step 49 to the next highest sector 34. For example, a calculated head skew of 11.3 would yield a computed head skew of 12. In the event the calculated head skew equals a whole number such as 11, the computed head skew would also be 11, as an example.

Using the average of the single-cylinder seek times and the standard deviation values derived as above, cylinder skew, skew$_c$, is also determined at step 49 by the following relationship:

$$skew_c = \left(\frac{\sum_{i=1}^{m} c}{m}\right) + (as_c) + \Delta_c$$

where a, as described above, is the coefficient of standard deviation and represents the percentage of slipped revolutions allowed. Similar to $\Delta_h$, $\Delta_c$, represents a performance compensation value for cylinder skew. A final determination of the cylinder skew is set in accordance with specific user requirements and specifications.

Preferably, computation of the cylinder skew includes conversion of the single-cylinder seek times to a number of sectors 34 over which the head 12 passes during the single-cylinder seek operation. In addition, computation of the cylinder skew preferably includes rounding the number of sectors 34 from the calculation of step 49 to the next highest sector 34. For example, a calculated cylinder skew of 5.2 would yield a computed cylinder skew of 6. In the event the calculated cylinder skew equals a whole number such as 5, the computed cylinder skew would also be 5, as an example.

It should be understood that standard deviation of head switch and single-cylinder seek times may be determined using methods/formulas other than those presented in this discussion. Once determined, the computed skew values, skew$_c$ and skew$_h$, are implemented into the particular disk drive 10 that the measured seek times were obtained from, at step 50, by storing the values to drive configuration pages of read/write zones (not shown).

In the embodiment described above, standard deviation and skew values for both head switch and single-cylinder seeks were calculated within the same respective steps. It should be understood, that alternatively, the aforementioned values can be calculated in separate steps.

Figure 5:
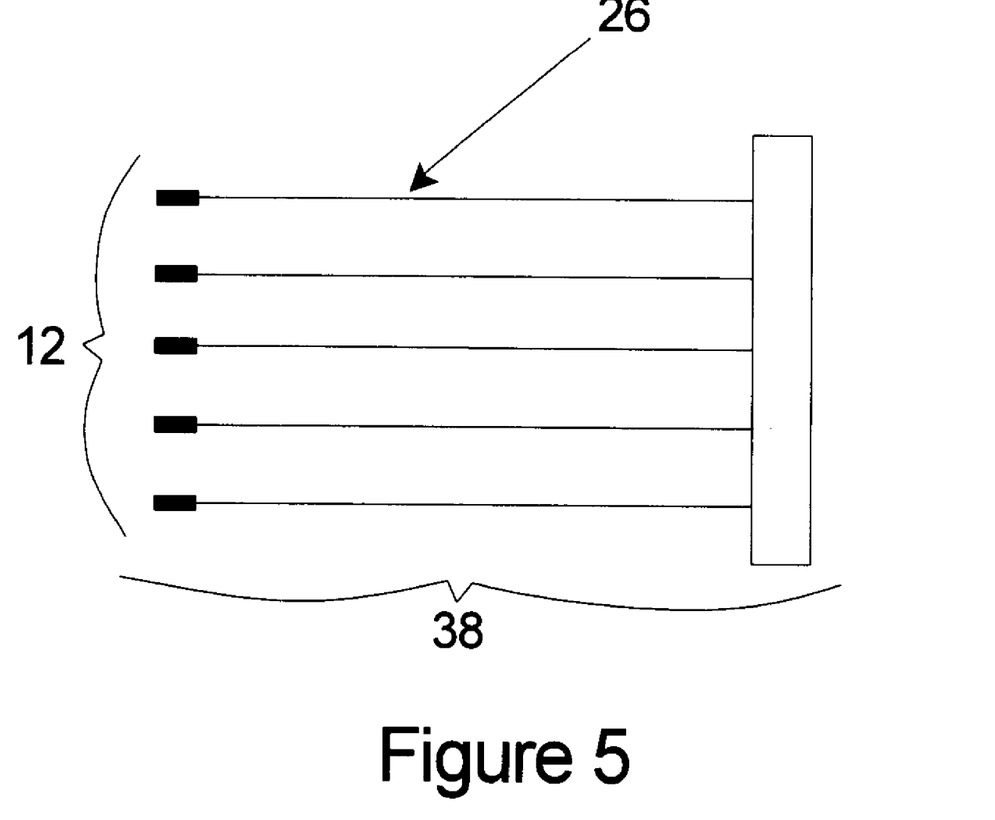
FIG. 5 is a representation of a portion of a head stack assembly.
Figure 8A:
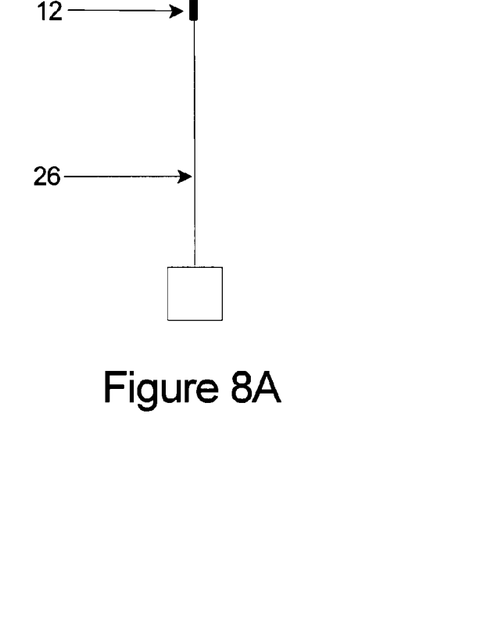
FIG. 8A is a top view of the portion of the head stack assembly shown in FIG. 5 illustrating idealized initial head alignment.
Figure 8B:
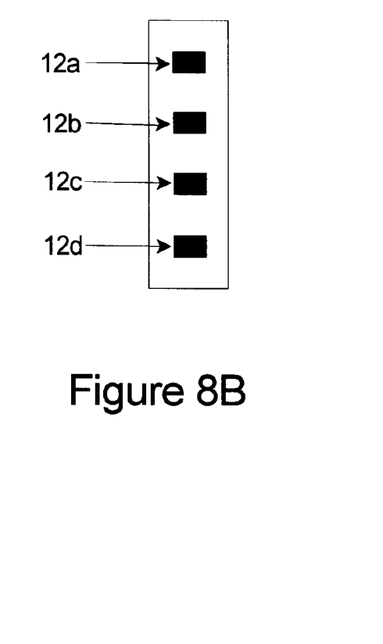
FIG. 8B is a side view FIG. 8A illustrating idealized initial head alignment.

As shown in FIGS. 5, 8A and 8B, prior to being initially fitted into a disk drive 10, the heads 12 in a head stack assembly 38 are typically in precise vertical alignment.

Figure 9A:
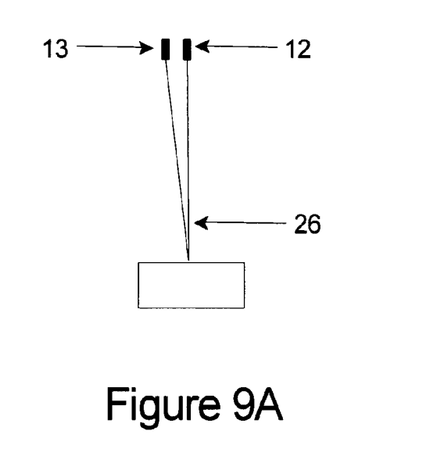
FIG. 9A is a top view of the portion of the head stack assembly shown in FIG. 5 illustrating an angular displacement or an offset between different heads in the head stack assembly.
Figure 9B:
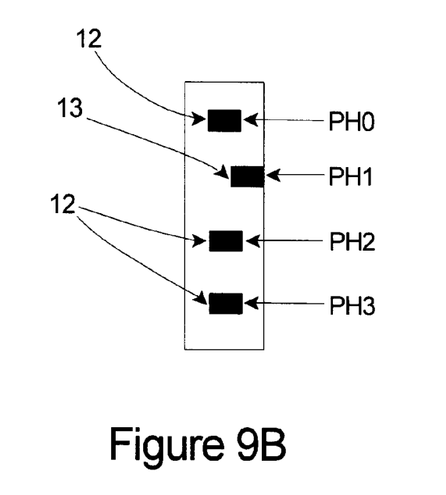
FIG. 9B is a side view of the FIG. 9A illustrating the angular displacement or the offset between different heads in the head stack assembly.

However, as shown in FIGS. 9A and 9B, the installation process and the effects of temperature fluctuations can affect the angular displacement of each individual head 12 causing one or more offset heads 13 relative to the remaining heads 12. Consequently, there are variations between heads 12 in observed head switch times as a result of the angular displacement or offset that can develop between adjacent heads 12. Thus, applying a uniform, single skew across all heads 12 has a negative impact on performance because it penalizes the more closely aligned heads 12 having shorter head switch times.

Procedures for developing separate skews for each head 12 of the disk drive 10 utilize a logical to physical relationship of the heads 12 of the disk drive 10, as provided in FIG. 7. FIG. 7 illustrates a disk drive 10 having two storage disks 14 and four heads 12. However, the logical to physical relationship can be developed for any disk drive 10 having any number of storage disks 14 and heads 12. A typical disk drive 10 formatting method assigns Logical Block Addresses (LBA's) to the storage disks 14 in the following manner, assuming n blocks (also sometimes referred to as sectors) per track:

LBA's 0 through n-1 are assigned to cylinder 0, physical head 0 (PH0);

LBA's n through 2n-1 are assigned to cylinder 0, physical head 1 (PH1);

LBA's 2n through 3n-1 are assigned to cylinder 0, physical head 2 (PH2);

LBA's 3n through 4n-1 are assigned to cylinder 0, physical head 3 (PH3);

LBA's 4n through 5n-1 are assigned to cylinder 1, physical head 3 (PH3);

LBA's 5n through 6n-1 are assigned to cylinder 1, physical head 2 (PH2);

LBA's 6n through 7n-1 are assigned to cylinder 1, physical head 1 (PH1);

LBA's 7n through 8n-1 are assigned to cylinder 1, physical head 0 (PH0);

LBA's 8n through 9n-1 are assigned to cylinder 2, physical head 0 (PH0);

etc.

This progression continues to the end of the storage surfaces 18. Note that on cylinder 1, LBA's are assigned beginning with PH3 and increase in value toward PH0. PH3, in this case, is also known as logical head 0 (LH0). Thus, on even-numbered cylinders 36a, the physical head number and the logical head number are identical, while on odd-numbered cylinders 36b, PH0 is known as LH3, PH1 is known as LH2, PH2 is known as LH1, and PH3 is known as LH0, as indicated on FIG. 7. As illustrated, two skews can be associated with PH0 and two skews can be associated with PH3. A cylinder skew is required when PH0 is the target head during a single-cylinder seek to an even-numbered cylinder 36a and when PH3 is the target head during a single-cylinder seek to an odd-numbered cylinder 36b. A head skew is required for PH0 when it is the target head during a head switch operation from adjacent PH1, which occurs during operations on an odd-numbered cylinder 36b. A head skew is also required for PH3 when it is the target head during a head switch operation from adjacent PH2, which occurs during operations on an even-numbered cylinder 36a, for example.

As a further example, as shown in FIG. 9B, because of an apparent angular displacement or offset of PH1 that has developed, two different head skews can be associated with PH2. One head skew exists when PH2 is the target head during a head switch operation from adjacent PH1 (even-numbered cylinder 36a). A second head skew exists when PH2 is the target head during a head switch operation from adjacent PH3 (odd-numbered cylinder 36b). Note that two head skews can exist for other physical heads depicted in FIG. 9B such as PH1. Additionally, disk drives 10 with a greater or lesser number of heads 12 can also have physical heads with at least one skew value.

Figure 6:
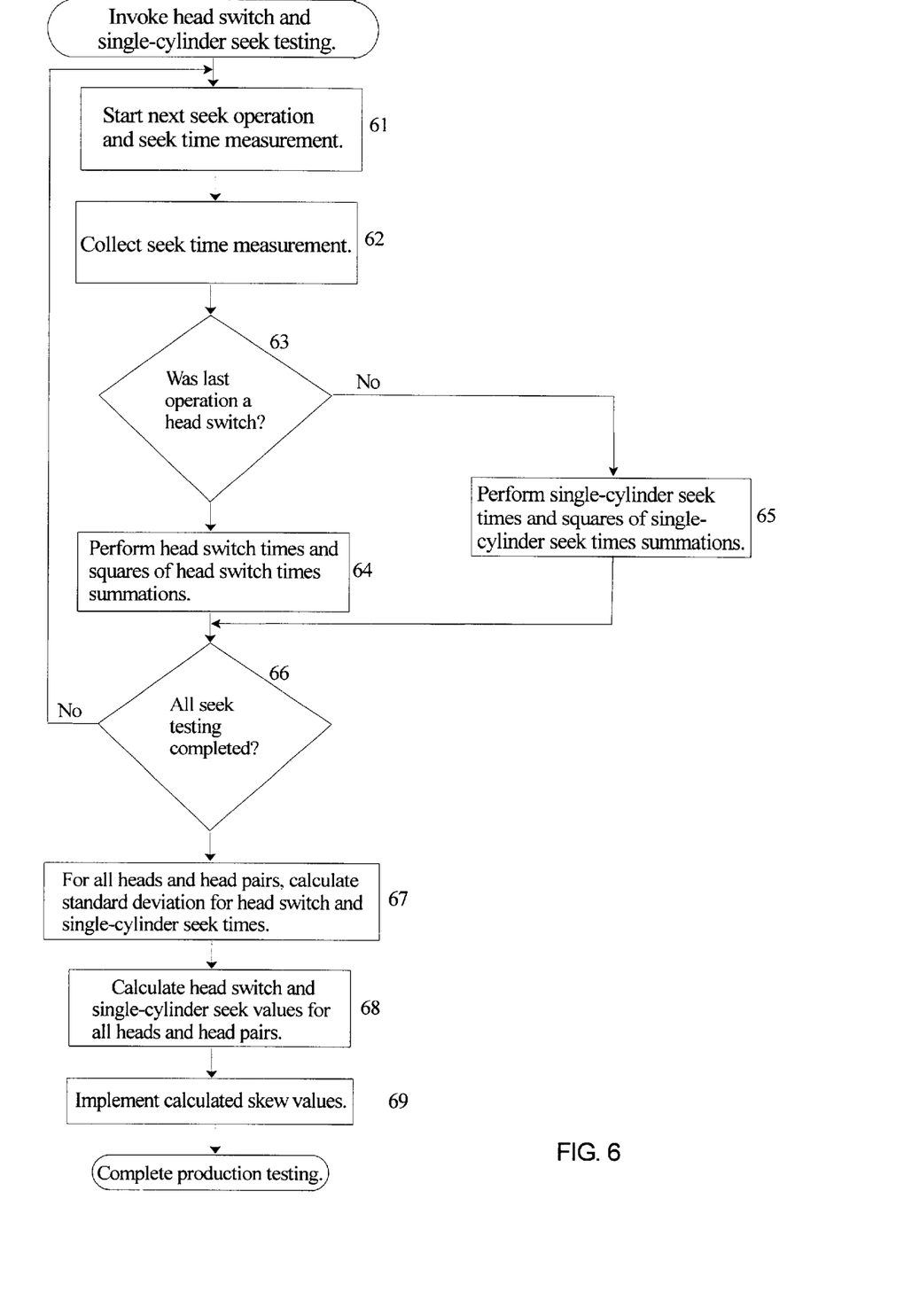
FIG. 6 is a flow diagram representation of a method for calculating and setting head skew for each individual head in accordance with the principles of the invention.

As shown in the flow diagram of FIG. 6, the present invention provides a method for determining head skew values unique to each head 12 during production of the disk drives 10. After invoking seek testing, the head skew determination process is as follows:

First, at Step 61 the system starts the next seek operation and measurement of the associated seek time. At Step 62, the seek time measurement is collected. Step 63 involves determining the type of seek operation just completed, i.e., head switch. If the seek operation was a head switch, at Step 64 the head switch times, h, are preferably summed in the following manner:

$$\sum_{i=1}^{n_x} (h_x)_i = \sum_{i=1}^{n_x-1} (h_x)_i + (h_x)_{n_x}$$

where:
x denotes the physical head switch pair, e.g., PH2 to PH3, or PH3 to PH2;
h=head switch time associated with the current head switch pair denoted by x; and
n=total number of head switch operations for this head switch pair.

As shown, the squares of the head switch times, h, are also summed at Step 64 in the following preferred manner:

$$\sum_{i=1}^{n_x} (h_x)_i^2 = \sum_{i=1}^{n_x-1} (h_x)_i^2 + (h_x)_{n_x}^2$$

where h, x and n are described as above.

Alternatively, if the seek operation was a single-cylinder seek, at Step 65 the seek times, c, are preferably summed in the following manner:

$$\sum_{i=1}^{m_y} (c_y)_i = \sum_{i=1}^{m_y-1} (c_y)_i + (c_y)_{m_y}$$

where y preferably denotes a target physical head, e.g., PH0 or PH3, for a single-cylinder seek operation that can occur during a sequential data transfer operation; and
m=the total number of single-cylinder seek operations for target physical head y. As shown, the squares of the seek times, c, are also summed at Step 65 in the following preferred manner:

$$\sum_{i=1}^{m_y} (c_y)_i^2 = \sum_{i=1}^{m_y-1} (c_y)_i^2 + (c_y)_{m_y}^2$$

After all of the seek testing and data collection operations have been completed (indicated in Step 66 of FIG. 6), standard deviations for all head switch times and single-cylinder seek times are calculated, as shown by Step 67. Standard deviations of head switch times, $(S_h)_x$, are calculated according to the following formula:

$$(s_h)_x = \sqrt{\frac{\sum_{i=1}^{n_x} h_x^2 - \frac{\left(\sum_{i=1}^{n_x} h_x\right)^2}{n_x}}{n_x - 1}}$$

and standard deviations of single-cylinder seek times, $(S_c)_y$, are calculated as follows:

$$(s_c)_y = \sqrt{\frac{\sum_{i=1}^{m_y} c_y^2 - \frac{\left(\sum_{i=1}^{m_y} c_y\right)^2}{m_y}}{m_y - 1}}$$

It should be understood by those skilled in the art that the standard deviation of head switch and single-cylinder seek times may be determined using methods and/or formulas other than those presented herein.

Using the standard deviations calculated above, skew values are then determined at Step 68. Specifically, the head switch skews, $(skew_h)_x$, are calculated according to the following relationship:

$$(skew_h)_x = \left(\frac{\sum_{i=1}^{n_x} h_x}{n_x}\right) + a(s_h)_x + \Delta_h$$

where "a" represents a coefficient of standard deviation based on the Normal Probability Distribution Curve and $\Delta_h$ denotes a compensation value that can be specified for performance matching and/or control purposes. Zero is a typical default value for $\Delta_h$. A final determination of the head skew for each head is set in accordance with specific user requirements and specifications.

Preferably, computation of the head skew for each head includes conversion of the head switch times to a number of sectors 34 over which the head 12 passes during the head switch time. In addition, computation of the head skew preferably includes rounding the number of sectors 34 from the calculation of step 68 to the next highest sector 34. As provided above, a calculated head skew of 11.3 would yield a computed head skew of 12. In the event the calculated head skew equals a whole number such as 11, the computed head skew would also be 11, for instance.

The single-cylinder seek skews, $(skew_c)_y$, are calculated according to the following relationship:

$$(skew_c)_y = \left(\frac{\sum_{i=1}^{m_y} c_y}{m_y}\right) + a(s_c)_y + \Delta_c$$

where a, as described above, is the coefficient of standard deviation and represents the percentage of slipped revolutions allowed. Similar to $\Delta_h$, $\Delta_c$ represents a performance compensation value for cylinder skew. A final determination of the cylinder skew is set in accordance with specific user requirements and specifications.

Preferably, computation of the cylinder skew includes conversion of the single-cylinder seek times to a number of sectors 34 over which the head 12 passes during the single-cylinder seek operation. In addition, computation of the cylinder skew preferably includes rounding the number of sectors 34 from the calculation of step 68 to the next highest sector 34. For example, a calculated cylinder skew of 5.2 would yield a computed cylinder skew of 6. In the event the calculated cylinder skew equals a whole number such as 5, the computed cylinder skew would also be 5, for instance.

Once determined, the skew values are implemented into the particular disk drive 10 from which the measured seek times were obtained at Step 69 by storing the values to the appropriate drive configuration pages (not shown).

Having thus described various embodiments of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A method of manufacturing a disk drive, the disk drive having a plurality of heads including a first head, the method comprising the steps of:
    initiating a head switch test series for the first head;
    measuring a head switch time for the first head;
    computing an average head switch time for the first head;
    computing a standard deviation of the head switch times for the first head; and
    computing a head skew based on the average and the standard deviation of the head switch times for the first head.

2. The method of claim 1 further comprising the step of implementing the head skew for the first head into the disk drive.

3. The method of claim 1 wherein each of the steps is performed on each of the heads.

4. The method of claim 3 further comprising the step of implementing the head skews for each of the heads into the disk drive.

5. The method of claim 4 wherein the step of computing the standard deviation of head switch times for each head further comprises the step of summing the measured head switch times for each of the heads.

6. The method of claim 5 wherein the step of summing the measured head switch times for each head further comprises the step of determining a sum after all head switch times for each head have been measured.

7. The method of claim 4 wherein the step of computing the standard deviations of head switch times for each head further comprises the step of summing the squares of each measured head switch time for each head.

8. The method of claim 7 wherein the step of summing the square of each measured head switch time for each head further comprises the step of determining a sum after all head switch times for each head have been measured.

9. The method of claim 8 wherein the head skew for each head permits a predetermined percentage of slipped revolutions to occur in the disk drive.

10. The method of claim 1 further comprising the steps of:
    initiating a single-cylinder seek test for each single-cylinder seek operation for the first head;
    measuring a single-cylinder seek time for the first head;
    computing an average single-cylinder seek time for the first head;
    computing a standard deviation of the single-cylinder seek times for the first head; and
    computing a cylinder skew based on the average and the standard deviation of the single-cylinder seek times for the first head.

11. The method of claim 10 further comprising the step of implementing the cylinder skew for the first head into the disk drive.

12. The method of claim 10 wherein each of the steps is performed on the each of the heads.

13. The method of claim 12 further comprising the step of implementing the cylinder skews for each of the heads into the disk drive.

14. The method of claim 13 wherein the step of computing the standard deviation of the single-cylinder seek times for each head further comprises the step of summing the measured single-cylinder seek times for each head.

15. The method of claim 14 wherein the step of summing the measured single-cylinder seek times for each head further comprises the step of determining a sum after all single-cylinder seek times for each head have been measured.

16. The method of claim 13 wherein the step of computing the standard deviation of the single-cylinder seek time for each head further comprises the step of summing the square of each measured single-cylinder seek time for each head.

17. The method of claim 16 wherein the step of summing the square of each measured single-cylinder seek time for each head further comprises the step of determining a sum after all single-cylinder seek times for each head have been measured.

18. The method of claim 17 wherein the cylinder skew for each head permits a predetermined percentage of slipped revolutions to occur in the disk drive.

19. A method of determining skew settings in a disk drive having a plurality of heads including a first head, the method comprising:
    measuring a head switch time for each head switch operation for the first head during a head switch test;
    calculating an average of the head switch times for the first head;
    calculating a standard deviation of the head switch times for the first head;

measuring a single-cylinder seek time for each single-cylinder seek operation for the first head during a single-cylinder seek test;

calculating an average of the single-cylinder seek times for the first head;

calculating a standard deviation of the single-cylinder seek times for the first head;

determining a head skew for the first head based on the average and the standard deviation of the head switch times; and determining a cylinder skew for the first head based on the average and the standard deviation of the measured single-cylinder seek times.

20. The method of claim 19 further including the step of repeating each step for each of the remaining heads of the disk drive.

21. A disk drive comprising:

a base;

a storage disk rotatably mounted to the base, the storage disk including a plurality of concentric tracks defined thereon;

a plurality of heads;

an actuator arm for positioning at least one of the heads near the plurality of concentric tracks; and skew setting for the at least one head determined by measuring a seek time for each head switch during a head switch test for each of said at least one head, calculating an average of the head switch times for each of the at least one heads, and calculating a standard deviation of the measured head switch times for each of the at least one heads.

22. A disk drive comprising:

a base;

a storage disk rotatably mounted to the base, the storage disk including a plurality of concentric tracks defined thereon;

an actuator arm for positioning at least one head near the plurality of concentric tracks; and skew settings for the at least one head determined by measuring seek times for all single-cylinder seeks during a single-cylinder seek test for each of said at least one head, calculating an average of the single-cylinder seek times for each of said at least one head, and calculating a standard deviation of the single-cylinder seek times for each of said at least one head.

23. A disk drive comprising:

a base;

a storage disk rotatably mounted to the base, the storage disk including a plurality of concentric tracks defined thereon;

a plurality of heads;

an actuator arm for positioning at least one of the heads near the plurality of concentric tracks; and skew setting for the at least one head determined by measuring a seek time for each head switch during a head switch test for each of the said at least one head, and calculating a standard deviation of the measured head switch times for each of the at least one heads.

24. The disk drive of claim 23 wherein the skew settings for the at least one head are determined by measuring seek times for all single-cylinder seeks during a single-cylinder seek test for each of said at least one head, and calculating at least one of (i) an average of the single-cylinder seek times for each of said at least one head, and (ii) a standard deviation of the single-cylinder seek times for each of said at least one head.

25. A disk drive comprising:

a base;

a storage disk rotatably mounted to the base, the storage disk including a plurality of concentric tracks defined thereon;

an actuator arm for positioning at least one head near the plurality of concentric tracks; and skew settings for the at least one head determined by measuring seek times for all single-cylinder seeks during a single-cylinder seek test for each of said at least one head, and calculating a standard deviation of the single-cylinder seek times for each of the said at least one head.

26. The disk drive of claim 25 wherein the disk drive includes a plurality of heads, and wherein the skew settings for the at least one head are determined by measuring a seek time for each head switch during a head switch test for each of said at least one head, and calculating at least one of (i) an average of the head switch times for each of said at least one head, and (ii) a standard deviation of the measured head switch times for each of said at least one head.

* * * * *

UNITED STATES PATENT AND TRADEMARK OFFICE
CERTIFICATE OF CORRECTION

PATENT NO.     : 6,493,171 B2
DATED          : December 10, 2002
INVENTOR(S)    : Enokida et al.

It is certified that error appears in the above-identified patent and that said Letters Patent is hereby corrected as shown below:

Column 13,
Line 9, please replace "setting" with -- settings --;
Lines 13 and 15, please replace "the at least one heads" with -- said at least one head --;

Column 14,
Line 9, please replace "setting" with -- settings --;
Line 11, please replace "the said at least one head" with -- said at least one head --;
Line 13, please replace "the at least one heads" with -- said at least one head --;
Lines 12-13, please replace "the said at least one head" with -- said at least one head --.

Signed and Sealed this

Fourth Day of March, 2003

JAMES E. ROGAN
*Director of the United States Patent and Trademark Office*